United States Patent
Pfau et al.

(10) Patent No.: US 10,562,627 B2
(45) Date of Patent: Feb. 18, 2020

(54) TRAY MOUNTED LONGITUDINAL GUIDE WITH CONVEYANCE IN THE LOWERED POSITION AND VERTICAL RESTRAINT IN THE RAISED POSITION

(71) Applicant: GOODRICH CORPORATION, Charlotte, NC (US)

(72) Inventors: Ryan Pfau, Jamestown, ND (US); Wallace Harold Larson, Jamestown, ND (US); Mark L. Olson, Jamestown, ND (US); Ryan Schafer, Jamestown, ND (US); Andrew Ray Uden, Jamestown, ND (US); Brian Landis, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 110 days.

(21) Appl. No.: 15/866,241

(22) Filed: Jan. 9, 2018

(65) Prior Publication Data
US 2019/0210728 A1  Jul. 11, 2019

(51) Int. Cl.
*B64D 9/00* (2006.01)
*B60P 7/13* (2006.01)
*B65G 13/12* (2006.01)

(52) U.S. Cl.
CPC ............... *B64D 9/003* (2013.01); *B60P 7/13* (2013.01); *B65G 13/12* (2013.01); *B64D 2009/006* (2013.01)

(58) Field of Classification Search
CPC .... B60P 7/08; B60P 7/13; B60P 3/055; B60P 3/075; B60P 3/077; B60P 3/07; B60P 3/073; B60P 1/6418; B65D 90/18; B65D 88/129; B65D 2519/00034; B65D 2519/00069; B65D 2519/00318; B65D 2519/00333; B60G 2200/30;
(Continued)

(56) References Cited

U.S. PATENT DOCUMENTS

| 3,377,040 A | 4/1968 | Hansen |
| 3,986,460 A | 10/1976 | Voigt et al. |
| 4,331,412 A | 5/1982 | Graf |

(Continued)

FOREIGN PATENT DOCUMENTS

| AU | 6712381 | 8/1981 |
| DE | 102010035099 | 2/2012 |
| EP | 0881144 | 12/1998 |

OTHER PUBLICATIONS

European Patent Office, European Search Report dated Apr. 29, 2019 in Application No. 19150916.5.

*Primary Examiner* — D Glenn Dayoan
*Assistant Examiner* — Sunsurraye Westbrook (57) ABSTRACT

A tray mounted lateral guide for use between trays of a cargo bay having a bay floor includes a main body defining a roller slot. The tray mounted lateral guide further includes a roller configured to be at least partially positioned in the roller slot and to facilitate conveyance of a pallet through the cargo bay. The tray mounted lateral guide further includes a lifter coupled to the main body and configured to be coupled to a tray and to maintain the main body in at least one of a lowered position or a raised position, the main body being further from the bay floor when in the raised position than when in the lowered position.

17 Claims, 11 Drawing Sheets

(58) Field of Classification Search
CPC ............ B60G 17/052; B60G 2200/345; B60G 2202/152; B60G 2204/17; B60G 2206/60; B60G 2300/04
USPC ...... 410/66, 67, 77, 80, 30, 3, 32, 46, 69, 7, 410/94, 96, 91, 90; 414/498, 537, 401, 414/494, 267, 276, 915, 814; 105/159, 105/1.1, 215.2, 29.1, 355, 393, 418
See application file for complete search history.

(56) References Cited

U.S. PATENT DOCUMENTS

| | | | |
|---|---|---|---|
| 5,131,606 A * | 7/1992 | Nordstrom | B64D 9/003 244/118.1 |
| 5,957,406 A | 9/1999 | Nelson | |
| 6,051,133 A * | 4/2000 | Huber | B64C 1/20 198/788 |
| 6,413,029 B1 * | 7/2002 | Kernkamp | B64D 9/003 410/77 |
| 6,425,717 B1 | 7/2002 | Saggio | |
| 6,485,238 B2 * | 11/2002 | Segura | B60P 7/13 410/69 |
| 6,557,800 B2 | 5/2003 | Medina | |
| 7,086,517 B2 * | 8/2006 | Clos | B64D 9/00 193/35 R |
| 7,344,013 B2 | 3/2008 | Krueger | |
| 7,731,460 B2 | 6/2010 | Brown | |
| 8,256,602 B2 | 9/2012 | Huber et al. | |
| 8,585,334 B2 | 11/2013 | Moradians | |
| 9,932,113 B1 | 4/2018 | Larson | |
| 10,106,239 B2 | 10/2018 | Woodland | |
| 10,118,700 B2 | 11/2018 | Kuppan | |
| 10,293,939 B2 | 5/2019 | Conejero Moreno | |
| 2004/0265085 A1 | 12/2004 | Mayer | |
| 2008/0310944 A1 | 12/2008 | Stegmiller | |
| 2012/0037753 A1 | 2/2012 | Huber et al. | |
| 2017/0197717 A1 | 7/2017 | Trisotto | |
| 2018/0222586 A1 | 8/2018 | Shivalinga | |
| 2018/0273177 A1 | 9/2018 | Jayaprakash | |
| 2019/0061945 A1 | 2/2019 | Quixano Mendez | |

* cited by examiner

TRAY MOUNTED LONGITUDINAL GUIDE WITH CONVEYANCE IN THE LOWERED POSITION AND VERTICAL RESTRAINT IN THE RAISED POSITION

FIELD

The present disclosure is directed to a cargo system and, more particularly, to a cargo system for facilitating movement of cargo through a cargo bay of an aircraft and for restraining movement of the cargo when desired.

BACKGROUND

Cargo systems may include multiple trays running along a cargo bay. The cargo systems may further include rollers positioned along a bay floor to facilitate movement of the cargo relative to the bay floor. It is desirable for the rollers to facilitate movement of the cargo throughout the cargo bay with relative ease during loading and unloading. However, it is undesirable for the cargo to move relative to the cargo bay at other times, such as during flight. Thus, restraint of cargo relative to the cargo bay is desirable at times.

SUMMARY

Described herein is a tray mounted lateral guide for use between trays of a cargo bay having a bay floor. The tray mounted lateral guide includes a main body defining a roller slot. The tray mounted lateral guide further includes a roller configured to be at least partially positioned in the roller slot and to facilitate conveyance of a pallet through the cargo bay. The tray mounted lateral guide further includes a lifter coupled to the main body and configured to be coupled to a tray and to maintain the main body in at least one of a lowered position or a raised position, the main body being further from the bay floor when in the raised position than when in the lowered position.

Any of the foregoing embodiments may also include a latch configured to fix the main body in at least one of the raised position or the lowered position.

In any of the foregoing embodiments, the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

Any of the foregoing embodiments may also include a lever configured to at least one of release the latch from the first notch in response to actuation of the lever or release the latch from the second notch in response to actuation of the lever.

Any of the foregoing embodiments may also include a spring coupled to the lifter and configured to cause the lifter to actuate the main body into the raised position in response to the latch being released from the first notch.

In any of the foregoing embodiments, the lifter is rotatably coupled to the main body and configured to be rotatably coupled to the tray, such that the lifter facilitates movement of the main body between the lowered position and the raised position via rotation of the lifter relative to the main body and to the tray.

Any of the foregoing embodiments may also include a restraint coupled to the main body and configured to be moved from an unrestrained position to a restrained position in which the restraint extends farther from the main body when in the restrained position than when in the unrestrained position, the restraint configured to resist movement of the pallet relative to the main body in response to being in the restrained position.

In any of the foregoing embodiments, the restraint is configured to be moved from the unrestrained position to the restrained position manually.

In any of the foregoing embodiments, the restraint is configured to be moved from the unrestrained position to the restrained position automatically in response to the main body being actuated to the raised position.

Any of the foregoing embodiments may also include a pin, wherein the restraint defines a pin slot configured to receive the pin; and the lifter defines a cam coupled to the pin and configured to actuate the pin relative to the pin slot such that movement of the pin relative to the pin slot actuates the restraint from the unrestrained position to the restrained position.

Any of the foregoing embodiments may also include an action bar coupled to the pin and in contact with the cam of the lifter such that the cam actuates the pin by actuating the action bar.

Also disclosed is a tray mounted lateral guide for use between trays of a cargo bay having a bay floor. The tray mounted lateral guide includes a main body. The tray mounted lateral guide further includes a restraint coupled to the main body and configured to be moved from an unrestrained position to a restrained position in which the restraint extends farther from the main body when in the restrained position than when in the unrestrained position, the restraint configured to resist movement of a pallet relative to the main body in response to being in the restrained position. The tray mounted lateral guide further includes a lifter coupled to the main body and configured to be coupled to a tray and to maintain the main body in at least one of a lowered position or a raised position, the main body being further from the bay floor when in the raised position than when in the lowered position.

Any of the foregoing embodiments may also include a pin, wherein the restraint defines a pin slot configured to receive the pin; and the lifter defines a cam coupled to the pin and configured to actuate the pin relative to the pin slot such that movement of the pin relative to the pin slot actuates the restraint from the unrestrained position to the restrained position.

Any of the foregoing embodiments may also include an action bar coupled to the pin and in contact with the cam of the lifter such that the cam actuates the pin by actuating the action bar.

Any of the foregoing embodiments may also include a latch configured to fix the main body in at least one of the raised position or the lowered position, wherein the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

Any of the foregoing embodiments may also include a lever configured to at least one of release the latch from the first notch in response to actuation of the lever or release the latch from the second notch in response to actuation of the lever.

Any of the foregoing embodiments may also include a spring coupled to the lifter and configured to cause the lifter to actuate the main body into the raised position in response to the latch being released from the first notch.

In any of the foregoing embodiments, the lifter is rotatably coupled to the main body and configured to be rotatably coupled to the tray, such that the spring forces rotation of the lifter relative to the main body and the tray in order to cause the lifter to actuate the main body into the raised position.

Also disclosed is a cargo system for moving and restraining cargo in a cargo bay having a bay floor. The cargo system includes a pair of trays oriented in parallel with each other. The cargo system also includes a tray mounted lateral guide. The tray mounted lateral guide includes a main body movably coupled to the pair of trays. The tray mounted lateral guide also includes a lifter coupled to the main body and at least one of the pair of trays and configured to maintain the main body in at least one of a lowered position or a raised position, the main body being further from the bay floor when in the raised position than when in the lowered position.

In any of the foregoing embodiments, the tray mounted lateral guide further includes a latch configured to fix the main body in at least one of the raised position or the lowered position, and the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the disclosure, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
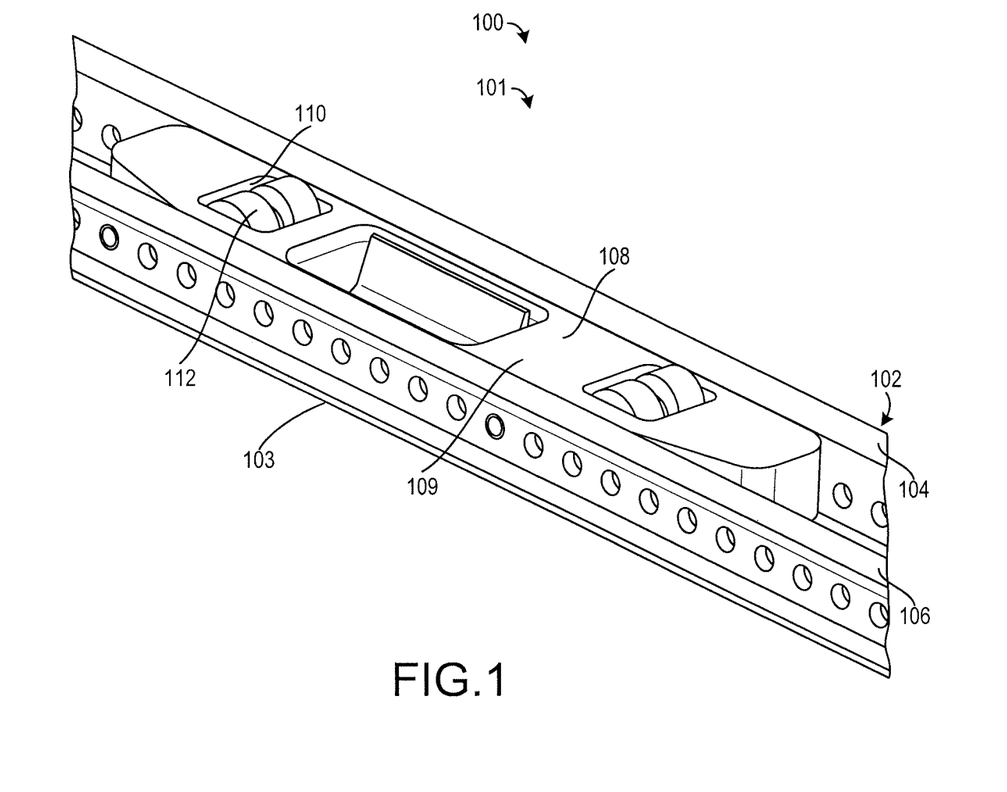
FIG. 1 illustrates a cargo system having a tray mounted lateral guide located between a pair of trays, in accordance with various embodiments.

Referring to FIG. 1, a cargo system 100 is shown. The cargo system 100 includes a cargo bay 101 having a bay floor 103. The bay floor 103 includes a pair of trays 102 including a first tray 104 and a second tray 106. The pair of trays 102 may be oriented in parallel with each other. The pair of trays 102 may include any rail, tray, or similar device, and may extend along a portion of the bay floor 103.

The cargo system 100 may further include a tray mounted lateral guide 108. The tray mounted lateral guide 108 may be located between the pair of trays 102. The tray mounted lateral guide 108 may include a main body 109. The main body 109 may define a roller slot 110 which may include a roller 112. The roller 112 may facilitate conveyance of cargo. Cargo, such as a pallet, may be positioned above the tray mounted lateral guide 108 and may move relative to the tray mounted lateral guide 108 via rolling across the rollers 112.

Figure 2:
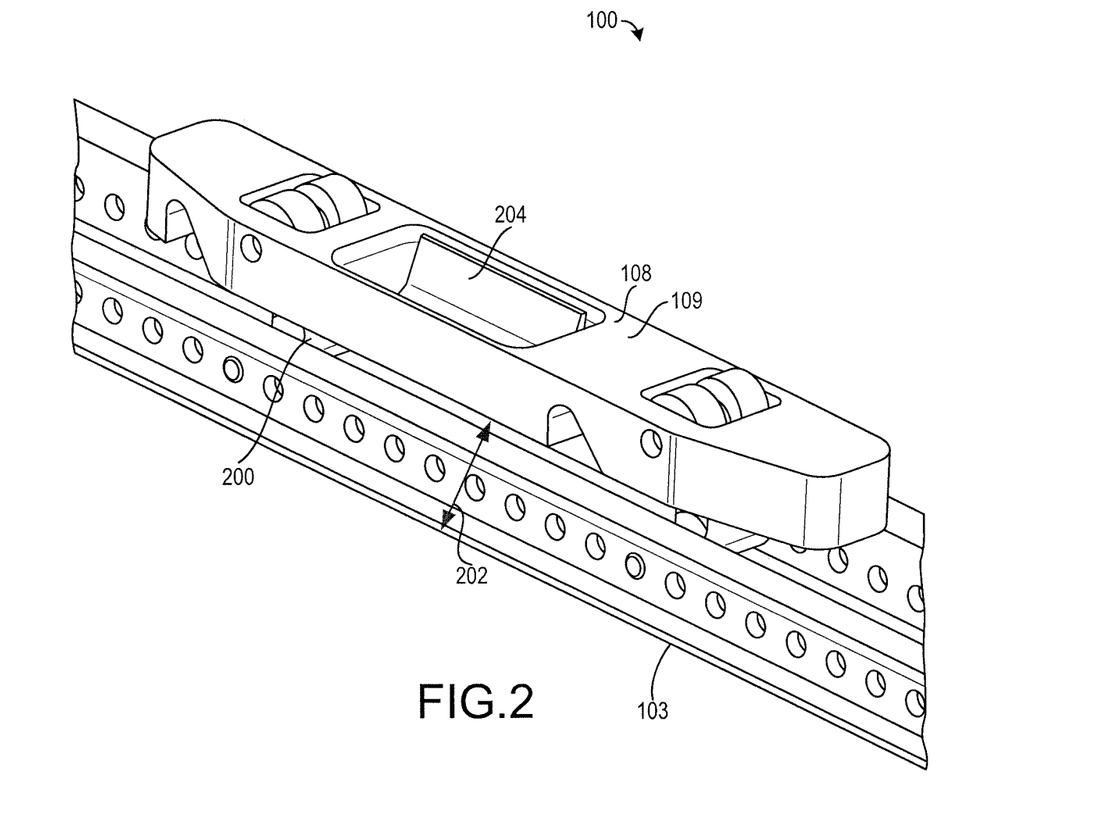
FIG. 2 illustrates the tray mounted lateral guide of FIG. 1 in a raised position, in accordance with various embodiments.

Referring now to FIGS. 1 and 2, the main body 109 of the tray mounted lateral guide 108 may have a lowered position (as shown in FIG. 1) and a raised position (as shown in FIG. 2). The main body 109 may be located farther from the bay floor 103 (i.e., farther by a distance 202) in response to the main body 109 being in the raised position relative to the main body being in the lowered position. In particular, the tray mounted lateral guide 108 may include one or more lifters 200 that may maintain the body in the selected position (i.e., the raised position or the lowered position).

Figure 3:
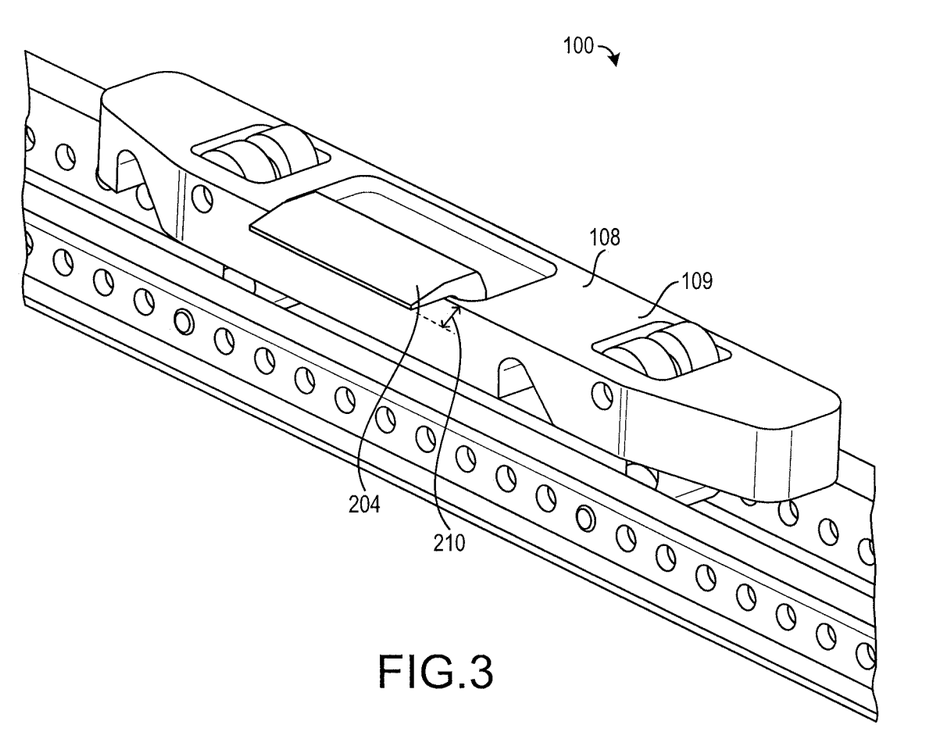
FIG. 3 illustrates the tray mounted lateral guide of FIG. 1 with a restraint in a restrained position, in accordance with various embodiments.

Turning to FIGS. 2 and 3, the tray mounted lateral guide 108 may further include a restraint 204. The restraint 204 may be coupled to the main body 109 and may be moved between an unrestrained position (as shown in FIG. 2) and a restrained position (as shown in FIG. 3). The restraint 204 may extend farther from the main body 109 in response to being in the restrained position (relative to being in the unrestrained position).

In response to the restraint 204 being in the restrained position, the restraint 204 may resist at least one of lateral or vertical movement of cargo, as will be described below. In various embodiments, the restraint 204 may be moved between the restrained position and the unrestrained position manually (i.e., a user may manually change the position of the restraint 204).

Figure 4:
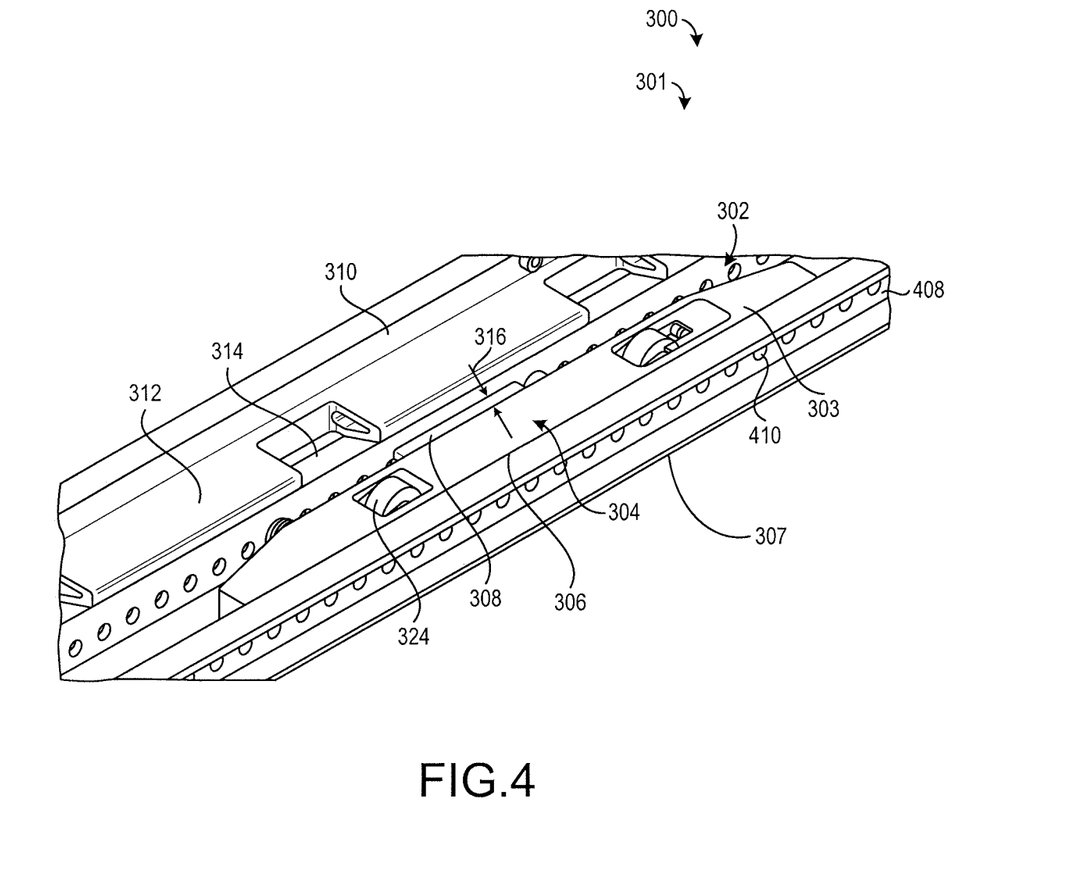
FIG. 4 illustrates a cargo system having a tray mounted lateral guide, in accordance with various embodiments.
Figure 5:
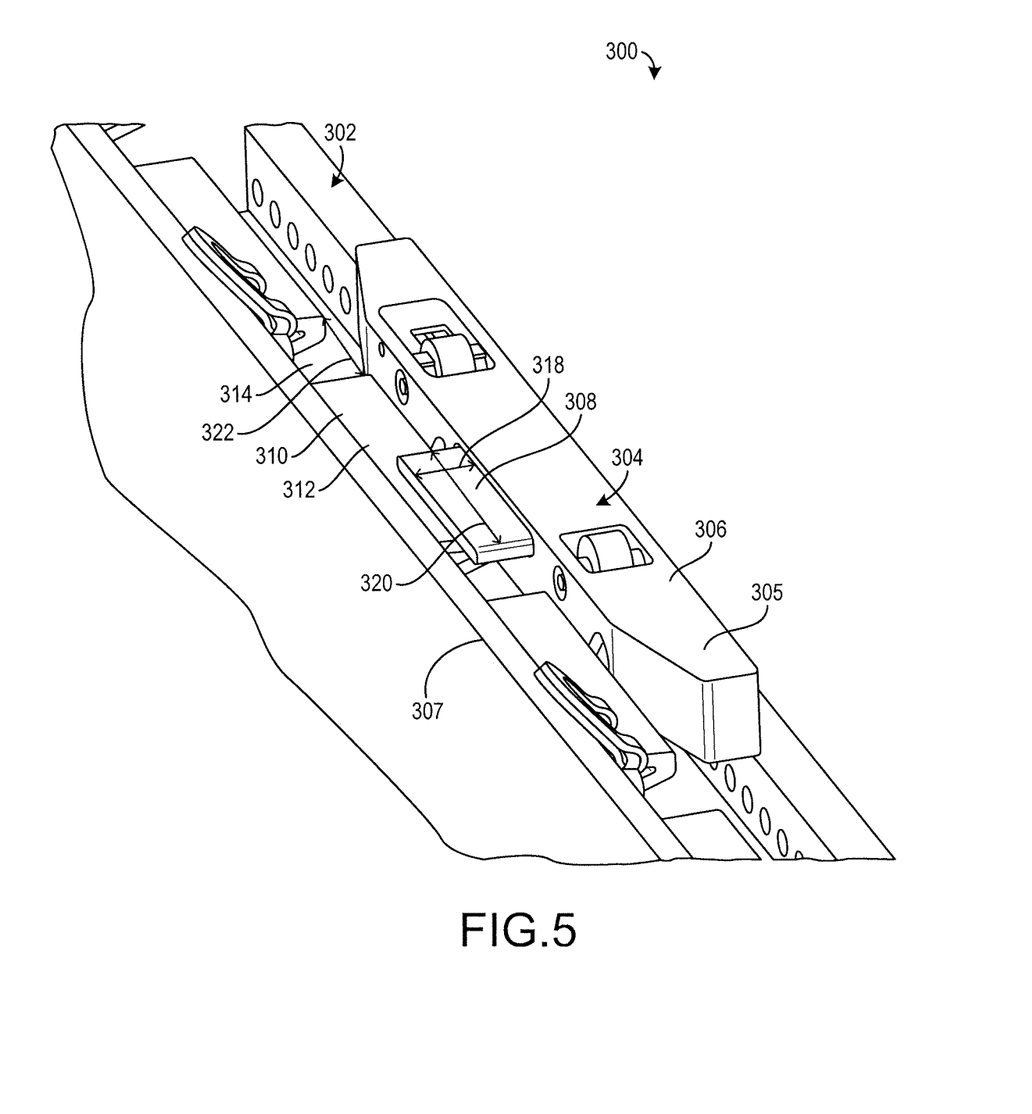
FIG. 5 illustrates the cargo system of FIG. 4 with a restraint in a restrained position, in accordance with various embodiments.

Referring now to FIGS. 4 and 5, another cargo system 300 is shown. The cargo system 300 may include a cargo bay 301 and a pair of trays 302 coupled to or positioned on a bay floor 307. The cargo system 300 may further include a tray mounted lateral guide 304 that may be maintained and, and moved between, a lowered position 303 and a raised position 305. The tray mounted lateral guide 304 may include a main body 306, a restraint 308, and rollers 324.

One or more pallet 310 may be designed for use with the cargo system 300. The pallet 310 may include a restraint lip 312 that is designed to interface with the restraint 308. In various embodiments, the restraint lip 312 may include gaps 314.

As shown in FIG. 4, the restraint 308 is in the unrestrained position. The restraint 308 may extend for a first distance 316 away from the main body 306 in response to being in the unrestrained position. As shown in FIG. 5, the restraint 308 is in the restrained position. In that regard, the restraint 308 may extend for a second distance 318 away from the main body 306 in response to being in the restrained position. The second distance 318 may be greater than the first distance 316.

In response to the pallet 310 being located adjacent the tray mounted lateral guide 304 and the restraint 308 being in the restrained position, the restraint 308 may be located above (i.e., farther from the bay floor 307 than) the restraint lip 312. In that regard, the restraint 308 may interface with the restraint lip 312 to resist movement of the pallet 310 relative to the tray mounted lateral guide 304.

The gaps 314 may have a gap width 322. The restraint 308 may have a restraint width 320. In various embodiments, the restraint width 320 may be greater than a gap width 322 to reduce the likelihood of the restraint 308 slipping through one or more of the gaps 314 of the restraint lip 312.

Figure 6A:
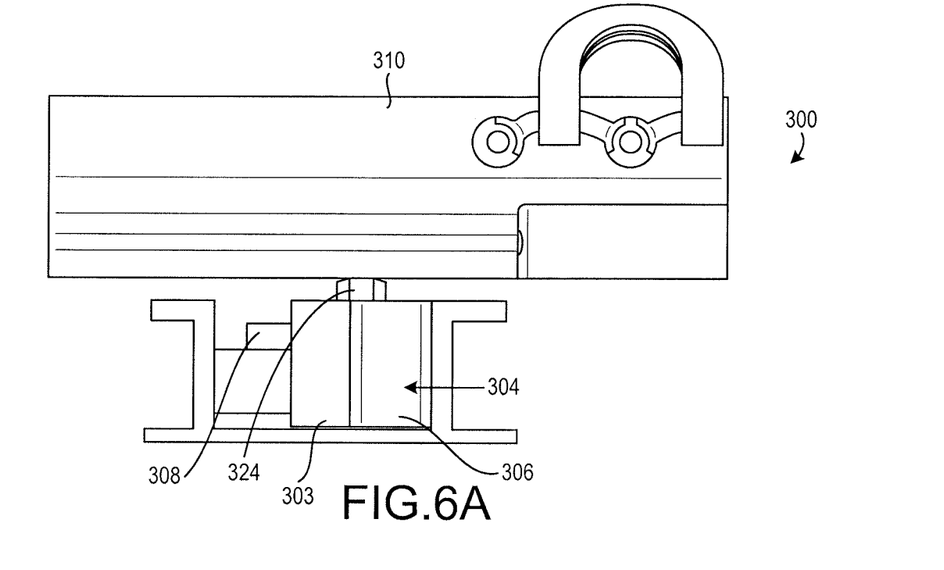
FIGS. 6A and 6B illustrate the tray mounted lateral guide of FIG. 4 in a lowered position and in a raised position, respectively, in accordance with various embodiments.

Turning to FIG. 6A, the pallet 310 may translate across the rollers 324 of the tray mounted lateral guide 304 in response to the main body 306 being in the lowered position 303. Furthermore, the restraint 308 may be in the unrestrained position in response to the main body 306 being in the lowered position 303 such that the restraint 308 is unlikely to resist desired movement of the pallet 310.

Figure 6B:
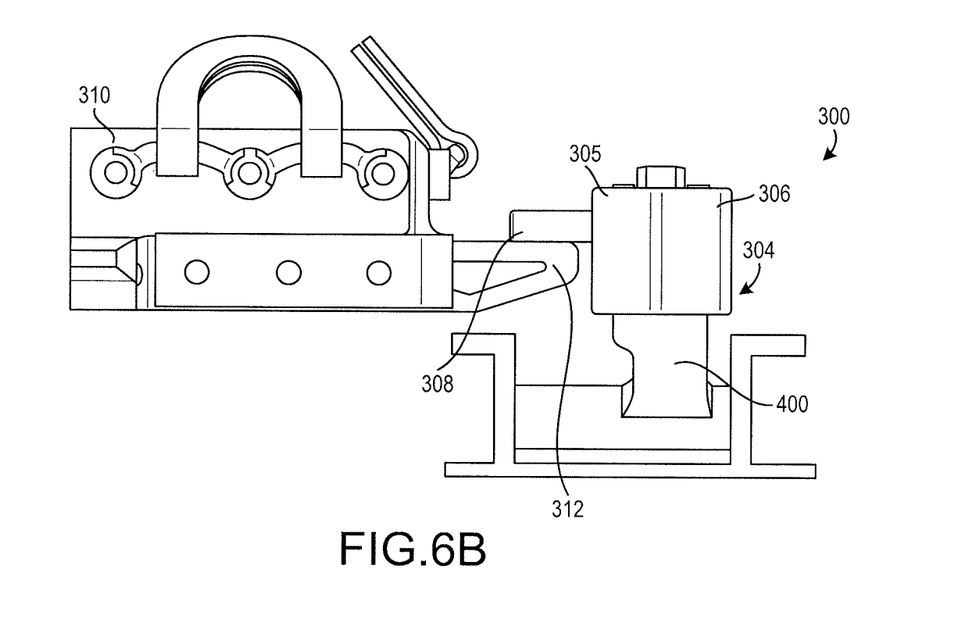

Turning now to FIG. 6B, the main body 306 may be in the raised position 305. As shown, the restraint 308 is in the restrained position and interfaces with the restraint lip 312 to resist movement of the pallet 310 relative to the tray mounted lateral guide 304. In various embodiments, the restraint 308 may automatically actuate into the restrained position in response to the main body 306 moving into the raised position 305. As shown, the tray mounted lateral guide 304 may include a lifter 400 for actuating or maintaining the main body 306 in the raised position 305.

Figure 7A:
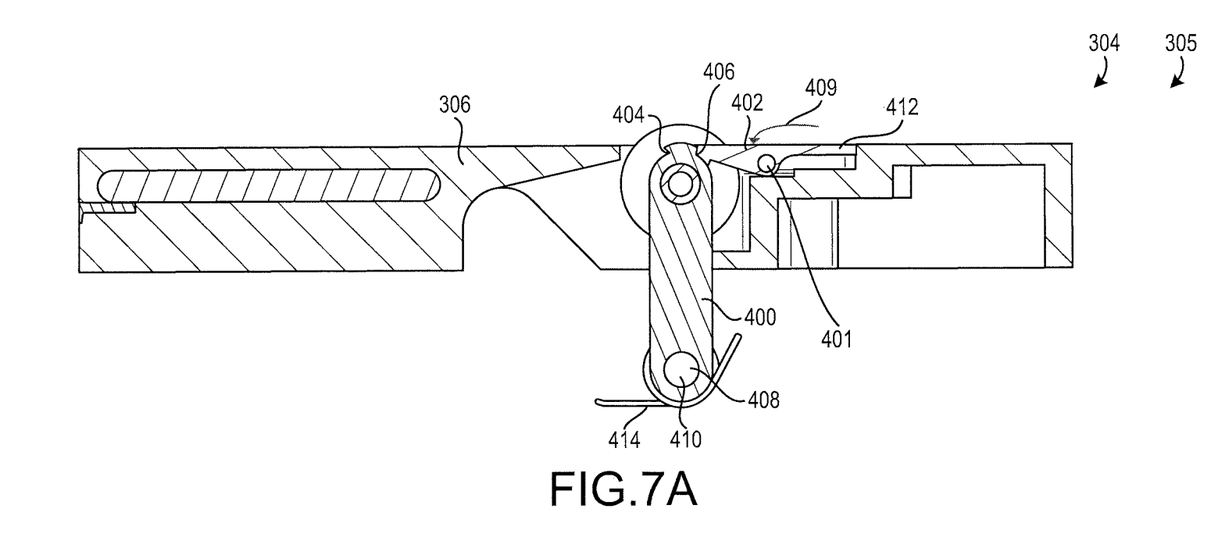
FIGS. 7A and 7B illustrate the tray mounted lateral guide of FIG. 4 in a raised position and in a lowered position, respectively, in accordance with various embodiments.
Figure 7B:
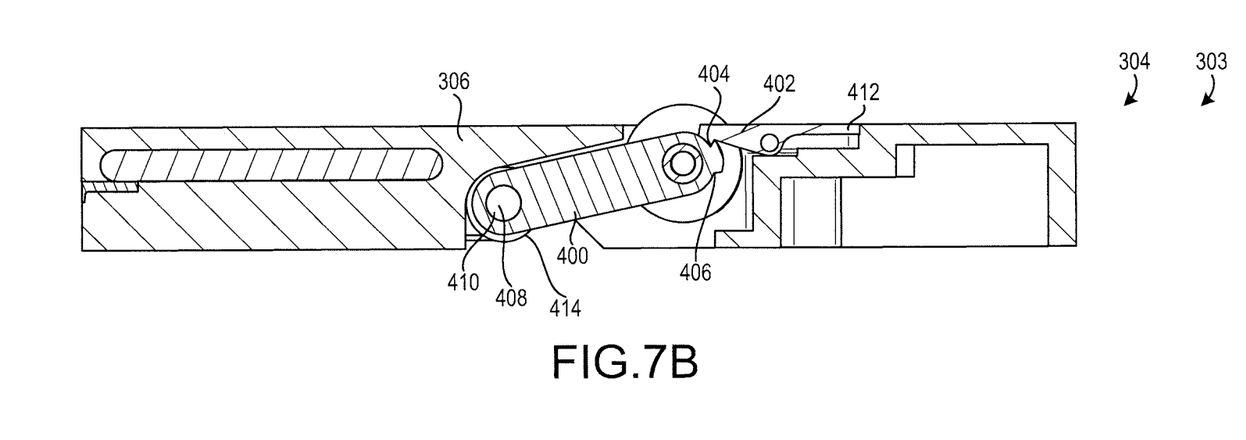

Referring now to FIGS. 7A and 7B, the tray mounted lateral guide 304 is shown in the raised position 305 and the lowered position 303, respectively. With brief reference to FIGS. 4, 7A, and 7B, the lifter 400 may be rotatably coupled to the main body 306, and may be rotatably coupled to a first tray 408 at a first location 410. In that regard and returning reference to FIGS. 7A and 7B, the lifter 400 may actuate the main body 306 between the raised position 305 and the lowered position 303 by rotating relative to the main body 306 and the first tray 408.

As shown, the tray mounted lateral guide 304 may include a latch 402, which may be coupled to the main body 306. The lifter 400 may include a first notch 404 and a second notch 406. In response to the latch 402 being received by the first notch 404, the latch 402 may maintain the main body 306 in the lowered position 303. Similarly, in response to the latch 402 being received by the second notch 406, the latch 402 may maintain the main body 306 in the raised position 305.

The tray mounted lateral guide 304 may include a lever 412 coupled to the latch 402. In various embodiments, the lever 412 and the latch 402 may include or be the same component. The lever 412 may be actuated in a downward direction as shown by an arrow 409 to release the latch 402 from at least one of the first notch 404 or the second notch 406.

In various embodiments, the tray mounted lateral guide 304 may include a spring 414 coupled to the lifter 400. The spring 414 may be compressed in response to the main body 306 being in the lowered position 303. In that regard, in response to actuation of the lever 412 to release the latch 402 from the first notch 404, the spring 414 may exert a rotational force on the lifter 400 to actuate the main body 306 into the raised position 305.

Figure 8:
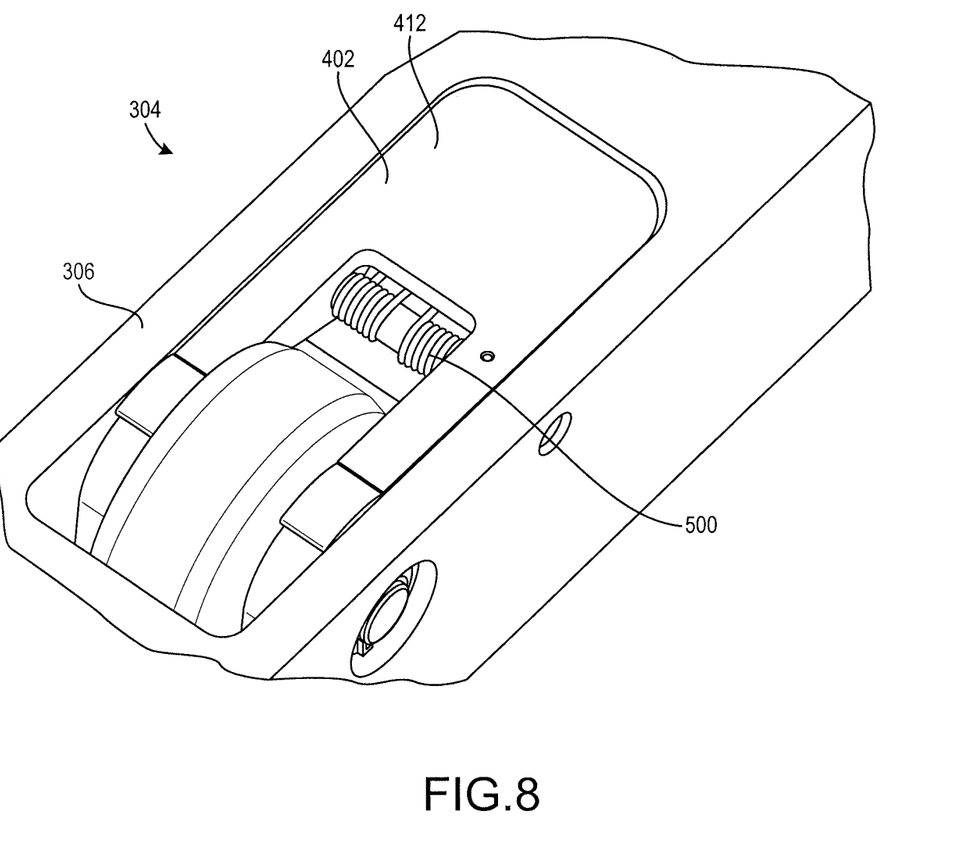
FIG. 8 illustrates a portion of the tray mounted lateral guide of FIG. 4, in accordance with various embodiments.
Figure 9A:
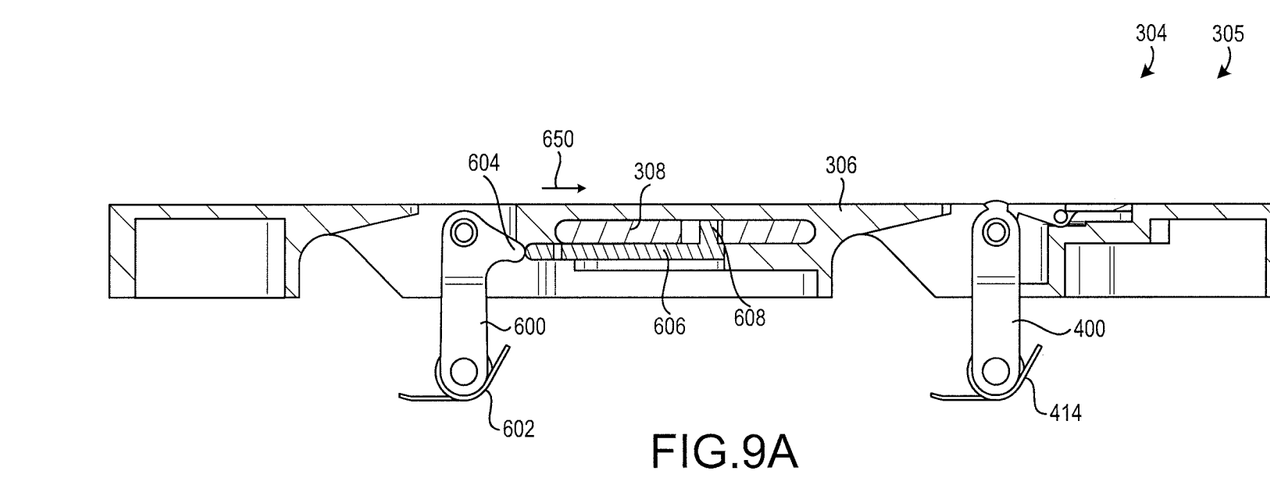
FIGS. 9A and 9B illustrate the tray mounted lateral guide of FIG. 4 in a raised position and in a lowered position, respectively, in accordance with various embodiments.
Figure 9B:
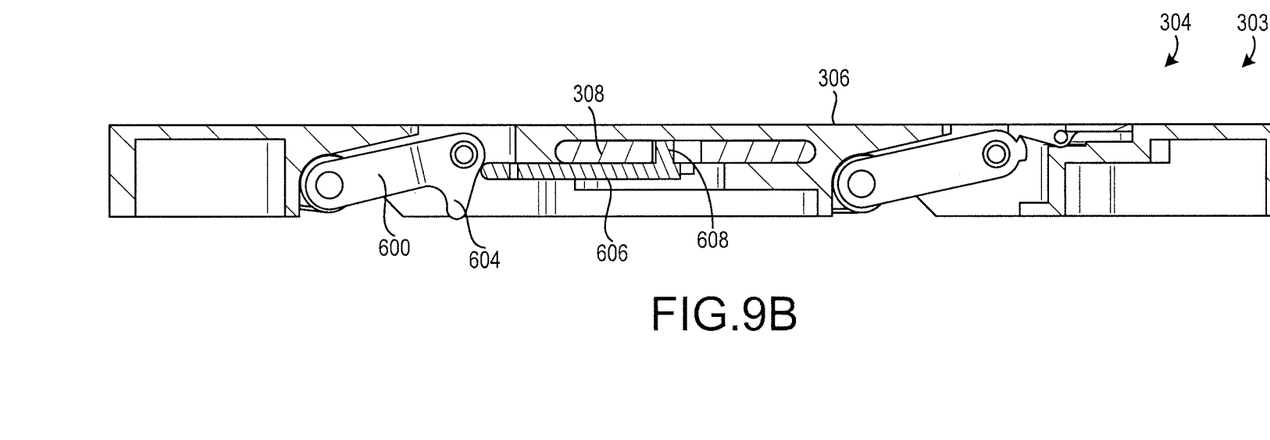
Figure 10A:
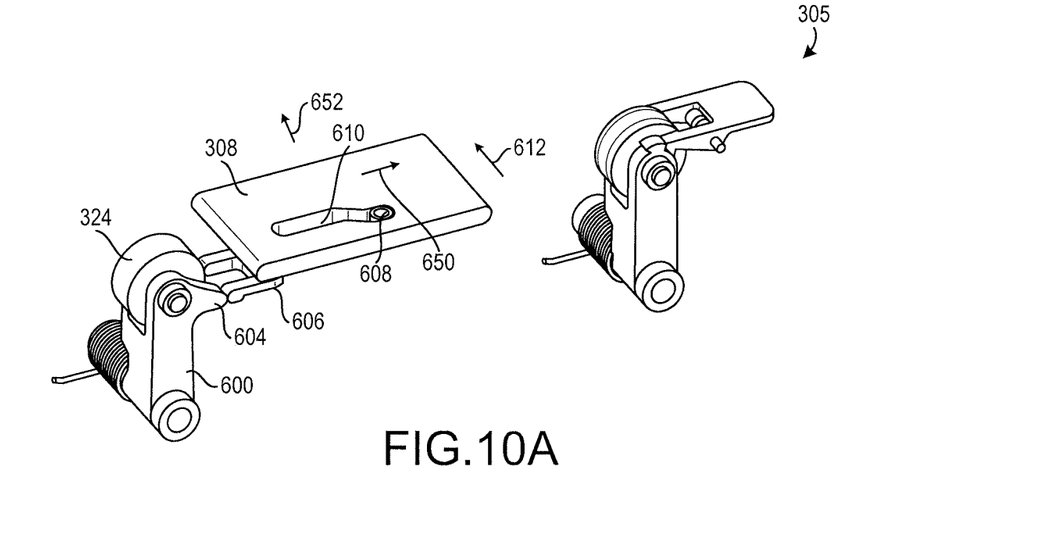
FIGS. 10A and 10B illustrate features of the tray mounted lateral guide of FIG. 4 in a raised position and in a lowered position, respectively, in accordance with various embodiments.
Figure 10B:
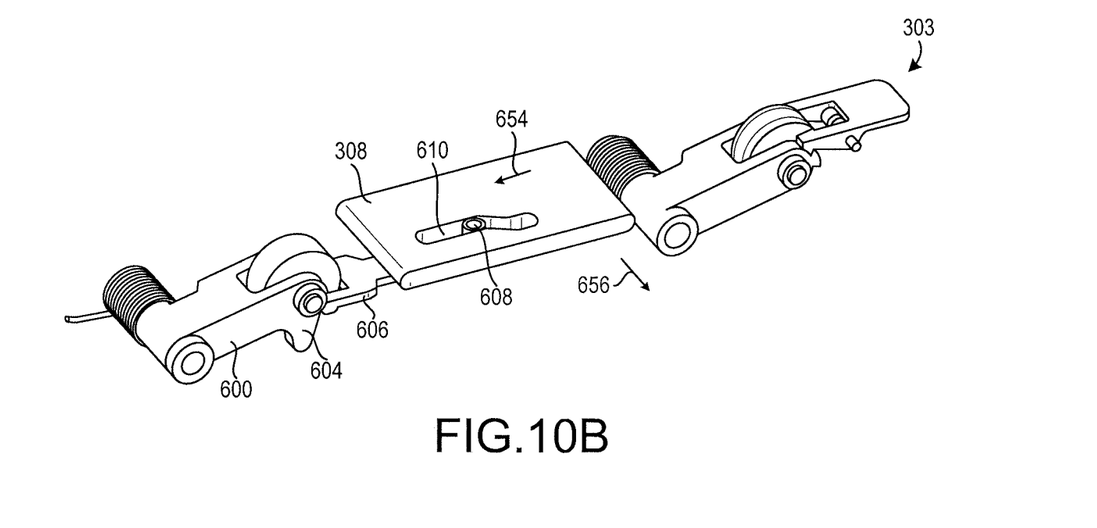

Referring to FIGS. 7A, 7B, and 8, the tray mounted lateral guide 304 may include a spring 500 coupled to at least one of the latch 402 or the lever 412. The spring 500 may exert a rotational force on the latch 402 (i.e., in the direction of the arrow 409) to cause the latch 402 to remain in place relative to at least one of the first notch 404 or the second notch 406. For example, the spring 500 may exert the rotational force about a latch hinge pin 401. In that regard, the main body 306 may be actuated from the raised position 305 to the lowered position 303 by depressing the lever 412, applying a downward force on the main body 306, and then releasing pressure on the lever 412 to cause the latch 402 to engage, or interface with, the first notch 404. Likewise, the main body 306 may be actuated from the lowered position 303 to the raised position 305 by depressing a lever 412 until the spring 414 causes the main body 306 to be in the raised position 305, and then releasing pressure on the lever 412 to cause the latch 402 to engage, or interface with, the second notch 406.

As mentioned above, the restraint 308 may be designed to automatically actuate from the unrestrained positioned to the restrained position as the tray mounted lateral guide 304 is actuated from the lowered position 303 to the raised position 305. In that regard and referring to FIGS. 9A, 9B, 10A, and 10B, the tray mounted lateral guide 304 may further include a second lifter 600. In various embodiments, operations described as relating to the first lifter 400 may be performed by the second lifter 600, operations described as relating to the second lifter 600 may be performed by the first lifter 400, or operations described as relating to either lifter 400, 600 may be performed by one or both lifter 400, 600. In various embodiments, the second lifter 600 may include a spring 602 that functions in a similar manner as the spring 414.

In various embodiments, the second lifter 600 may include or define a cam 604. The tray mounted lateral guide 304 may include an action bar 606. In various embodiments, the action bar 606 may be located in the main body 306. In various embodiments, the tray mounted lateral guide 304 may further include a pin 608, and the restraint 308 may include or define a pin slot 610.

As the main body 306 actuates from the lowered position 303 to the raised position 305, the cam 604 may exert a force on the action bar 606 in a direction 650. As the action bar 606 is actuated in the direction 650, the action bar 606 may likewise direct the pin 608 in the direction 650. Due to the shape of the pin slot 610, the pin 608 may force the restraint 308 in a direction 652 (i.e., away from the main body 306) as the pin 608 is actuated in the direction 650.

As the main body 306 is returned to the lowered position 303 from the raised position 305, the cam 604 (or another force provider, such as a spring) may cause the action bar 606, and thus the pin 608, to return through the pin slot 610 in a direction 654, thus causing the restraint 308 to move in a direction 656 (i.e., towards the main body 306).

Figure 11:
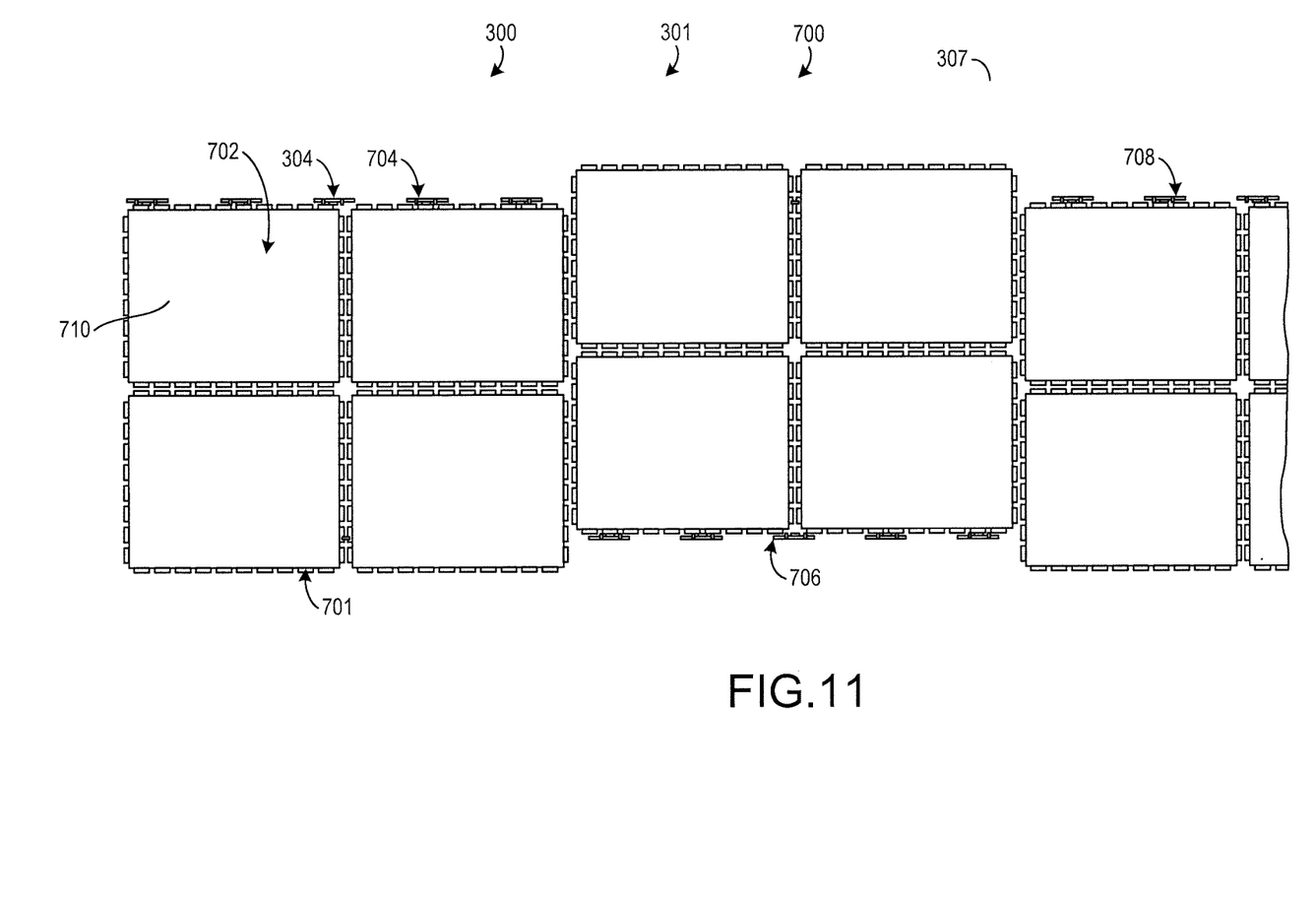
FIG. 11 illustrates the cargo system of FIG. 4 including multiple sets of tray mounted lateral guides, in accordance with various embodiments.

Referring to FIG. 11, the cargo system 300 may be implemented in the cargo bay 301 of an aircraft 700. Multiple tray mounted lateral guides 304 may be located along the bay floor 307. In various embodiments, the tray mounted lateral guides 304 may be staggered along the bay floor 307. For example, a first set of tray mounted lateral guides 704 may be located in a first location, a second set of tray mounted lateral guides 706 may be located in a second location, and a third set of tray mounted lateral guides 708 may be located in a third location. The cargo system 300 may further include rollers 701. Pallets 702, such as a pallet 710, may be loaded into the cargo bay 301 over the rollers 701, including any rollers of the tray mounted lateral guides 304. As the pallets 702 are located in their desired position, the tray mounted lateral guides 304 may be actuated to restrain movement of the pallets 702 relative to the cargo bay 301.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tray mounted lateral guide for use between trays of a cargo bay having a bay floor, comprising:
    a main body defining a roller slot;
    a roller configured to be at least partially positioned in the roller slot and to facilitate conveyance of a pallet through the cargo bay;
    a lifter coupled to the main body and configured to be coupled to a tray and to maintain the main body in at least one of a lowered position or a raised position, the main body being further from the bay floor when in the raised position than when in the lowered position, the lifter defining a cam;
    a restraint defining an elongated pin slot, coupled to the main body, and configured to be moved from an unrestrained position to a restrained position in which the restraint extends farther from the main body when in the restrained position than when in the unrestrained position, the restraint configured to resist movement of the pallet relative to the main body in response to being in the restrained position; and
    a pin configured to be received by the elongated pin slot and to be actuated through the elongated pin slot by the cam in response to the main body being actuated between the lowered position and the raised position, such that actuation of the pin through the elongated pin slot actuates the restraint between the unrestrained position and the restrained position.

2. The tray mounted lateral guide of claim 1, further comprising a latch configured to fix the main body in at least one of the raised position or the lowered position.

3. The tray mounted lateral guide of claim 2, wherein the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

4. The tray mounted lateral guide of claim 3, further comprising a lever configured to at least one of release the latch from the first notch in response to actuation of the lever or release the latch from the second notch in response to actuation of the lever.

5. The tray mounted lateral guide of claim 4, further comprising a spring coupled to the lifter and configured to cause the lifter to actuate the main body into the raised position in response to the latch being released from the first notch.

6. The tray mounted lateral guide of claim 1, wherein the lifter is rotatably coupled to the main body and configured to be rotatably coupled to the tray, such that the lifter facilitates movement of the main body between the lowered position and the raised position via rotation of the lifter relative to the main body and to the tray.

7. The tray mounted lateral guide of claim 1, wherein the restraint is configured to be moved from the unrestrained position to the restrained position manually.

8. The tray mounted lateral guide of claim 1, wherein the restraint is configured to be moved from the unrestrained position to the restrained position automatically in response to the main body being actuated to the raised position.

9. The tray mounted lateral guide of claim 1, further comprising an action bar coupled to the pin and in contact with the cam of the lifter such that the cam actuates the pin by actuating the action bar.

10. A tray mounted lateral guide for use between trays of a cargo bay having a bay floor, comprising:
    a main body;
    a restraint defining an elongated pin slot, coupled to the main body, and configured to be moved from an unrestrained position to a restrained position in which the restraint extends farther from the main body when in the restrained position than when in the unrestrained position, the restraint configured to resist movement of a pallet relative to the main body in response to being in the restrained position;
    a lifter coupled to the main body and configured to be coupled to a tray and to maintain the main body in at least one of a lowered position or a raised position, the main body being further from the bay floor when in the raised position than when in the lowered position, the lifter defining a cam; and
    a pin configured to be received by the elongated pin slot and to be actuated through the elongated pin slot by the cam in response to the main body being actuated between the lowered position and the raised position, such that actuation of the pin through the elongated pin slot actuates the restraint between the unrestrained position and the restrained position.

11. The tray mounted lateral guide of claim 10, further comprising an action bar coupled to the pin and in contact with the cam of the lifter such that the cam actuates the pin by actuating the action bar.

12. The tray mounted lateral guide of claim 10, further comprising a latch configured to fix the main body in at least one of the raised position or the lowered position, wherein the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

13. The tray mounted lateral guide of claim 12, further comprising a lever configured to at least one of release the latch from the first notch in response to actuation of the lever or release the latch from the second notch in response to actuation of the lever.

14. The tray mounted lateral guide of claim 13, further comprising a spring coupled to the lifter and configured to cause the lifter to actuate the main body into the raised position in response to the latch being released from the first notch.

15. The tray mounted lateral guide of claim 14, wherein the lifter is rotatably coupled to the main body and configured to be rotatably coupled to the tray, such that the spring forces rotation of the lifter relative to the main body and the tray in order to cause the lifter to actuate the main body into the raised position.

16. A cargo system for moving and restraining cargo in a cargo bay having a bay floor, comprising:
    a pair of trays oriented in parallel with each other; and
    a tray mounted lateral guide having:
        a main body movably coupled to the pair of trays,
        a lifter coupled to the main body and at least one of the pair of trays and configured to maintain the main body in at least one of a lowered position or a raised position, the main body being further from the bay floor when in the raised position than when in the lowered position, the lifter defining a cam,
        a restraint defining an elongated pin slot, coupled to the main body, and configured to be moved from an unrestrained position to a restrained position in which the restraint extends farther from the main body when in the restrained position than when in the unrestrained position, the restraint configured to resist movement of the pallet relative to the main body in response to being in the restrained position, and
        a pin configured to be received by the elongated pin slot and to be actuated through the elongated pin slot by the cam in response to the main body being actuated between the lowered position and the raised position, such that actuation of the pin through the elongated pin slot actuates the restraint between the unrestrained position and the restrained position.

17. The cargo system of claim 16, wherein:
    the tray mounted lateral guide further includes a latch configured to fix the main body in at least one of the raised position or the lowered position; and
    the lifter includes a first notch configured to interface with the latch to cause the lifter to remain in the lowered position in response to the latch interfacing with the first notch, and a second notch configured to interface with the latch to cause the lifter to remain in the raised position in response to the latch interfacing with the second notch.

* * * * *